March 6, 1973     C. C. CLARK     3,719,256
RETRO-ROCKET BRAKING SYSTEM FOR LAND VEHICLES
Filed June 18, 1971
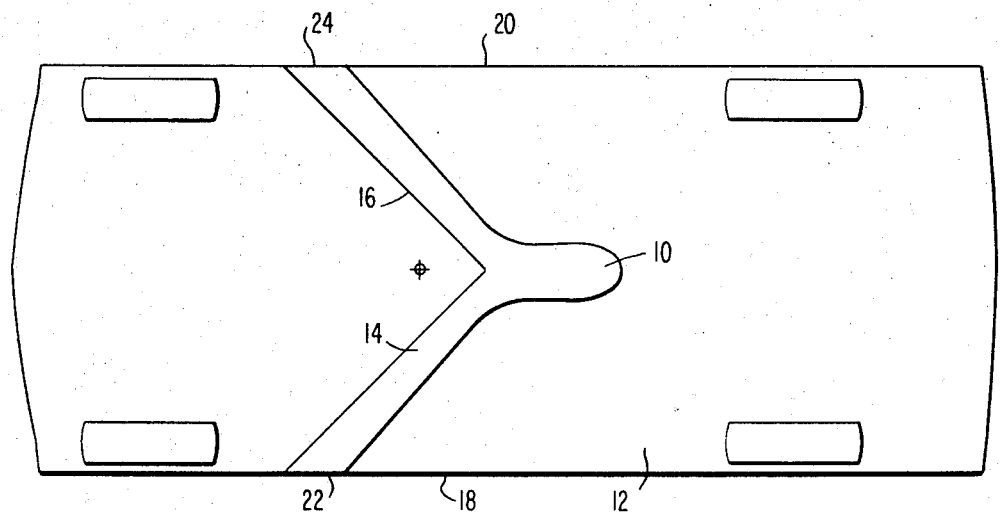
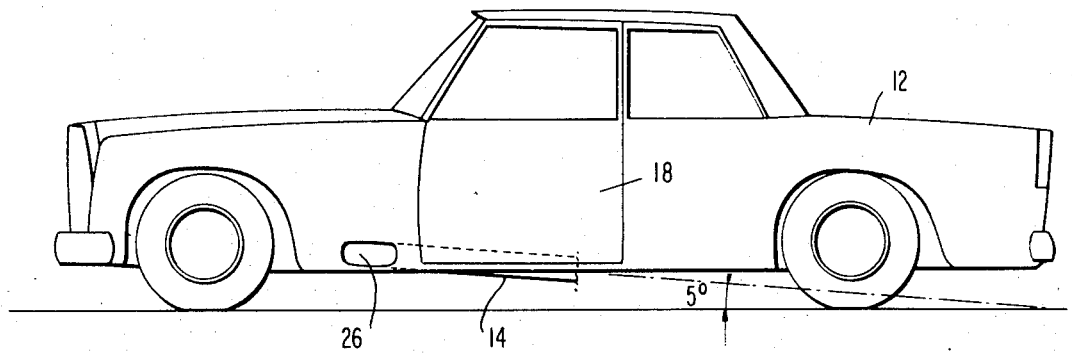
INVENTOR
CARL C. CLARK
BY
ATTORNEYS

United States Patent Office 3,719,256
Patented Mar. 6, 1973

3,719,256
RETRO-ROCKET BRAKING SYSTEM FOR LAND VEHICLES
Carl C. Clark, 23 Seminole Ave., Baltimore, Md. 21228
Filed June 18, 1971, Ser. No. 154,333
Int. Cl. B60k 1/12
U.S. Cl. 188—2 R    3 Claims

ABSTRACT OF THE DISCLOSURE

A rocket motor is secured to the frame adjacent the underside of the vehicle and is provided with two diverging nozzles extending forwardly at an angle to the center line of the vehicle and terminating at the sides thereof. The lines of thrust along each nozzle intersect rearwardly of the center of mass of the vehicle and are disposed at approximately a 5° incline relative to the horizontal such that the thrust plane defined by the two nozzles intersects the surface on which the vehicle is travelling rearwardly of the area defined by the wheels of the vehicle.

BACKGROUND OF THE INVENTION

Field of the invention

The present invention relates generally to the field of braking systems for land vehicles and more specifically to a retrorocket braking system.

Prior art

Most braking systems for land vehicles utilize a mechanically applied friction force to stop the rotation of the wheels of the vehicle. The mechanical force is generally controlled by pneumatic, electrical or manual means. The reliability of such systems are dependent primarily on the reaction time of the vehicle operator as well as the coefficient of friction between the vehicle wheels and the surface upon which the vehicle is travelling. As a result it may take several hundred feet to stop a vehicle travelling at 60 miles an hour.

Some vehicle braking systems have been supplemented by an aerodynamic drag type brake wherein a substantially flat member is extended perpendicular to the direction of vehicle travel which provides substantial resistance to the air flow around the vehicle. Another variation of the air drag type brake consists in releasing a small parachute which is secured to the rear of the vehicle to provide an additional braking force. Although such drag type brakes assist in bringing the vehicle to a rapid halt, the time and distances involved are still excessive from a safety point of view.

Other prior art devices have utilized a reverse thrust arrangement to supplement the mechanical braking means on a vehicle. Most common of these reverse thrust arrangements are utilized in aircraft after the wheels have made contact with the runway upon landing. In propeller type aircraft the pitch of the blades are reversed to provide the reverse thrust and in jet type aircraft suitable deflectors are moved into position across the exhaust from the jet engine to deflect the jet thrust in a forward direction. It has also been proposed to mount a propeller on an automobile which may be selectively driven by the vehicle engine to exert a thrust in a direction opposite to the direction of travel of the vehicle to assist in bringing the vehicle to a stop.

It has also been proposed to mount a rocket motor on the frame of an automobile along the longitudinal centerline thereof with the single exhaust nozzle thereof directed forwardly and upwardly. Although the primary purpose of the rocket motor is to provide a force to operate the mechanical braking system previously described, there is a certain degree of reverse thrust which will aid in stopping the vehicle. However, the single exhaust nozzle does not provide any lateral stability to prevent the vehicle from going into a turning skid or to assist in straightening out the vehicle if it has already entered such a skid. Furthermore, the angle of the rocket motor relative to the horizontal is such that the line of force will intersect the road surface within the area defined by the four wheels of the vehicle. The concentration of such a large and sudden force within the area of the wheels could provide severe overloading on the pneumatic tires of the vehicle sufficient to rupture the tires and seriously affect the control of the motor vehicle.

SUMMARY OF THE INVENTION

The present invention provides a retrorocket braking system for motor vehicles which is superior to any of the above-described prior art supplemental braking arrangements with respect to stability, simplicity, and shorter stopping distances.

The present system is comprised of at least one rocket motor secured to the frame of a motor vehicle near the longitudinal centerline thereof. The rocket motor is provided with two exhaust nozzles disposed in an angle relative to the centerline of the motor vehicle which terminates at the sides of the vehicle adjacent the front doors thereof. The lines of thrust along the nozzles intersect at a point rearwardly of the center of mass of the vehicle and are disposed in a plane angled at approximately 5° with respect to the horizontal and intersecting the surface upon which the vehicle is travelling at a point rearwardly of the wheels of the vehicle. The rocket motor may be fired manually or automatically. The automatic firing could be triggered by a speed sensor in combination with a malfunction detector system. Such a malfunction detector system could include a radar device for sensing rapidly approaching obstacles, zero G on any wheel with an appropriate time delay, a lateral G above a predetermined amount above a certain speed or an impact above 5G above a certain speed.

The present invention provides a supplemental braking system which provides a high degree of lateral stability as a result of the diverging rocket motor nozzles. The present system provides for a higher ratio of reverse thrust to downward thrust than existing systems to provide a greater stopping force and to eliminate the danger of tire overloading.

The foregoing and other objects, features and advantages of the invention will be aparent from the following more particular description of a preferred embodiment of the invention and illustrated in the accompanying drawings.

IN THE DRAWINGS

FIG. 1 is a schematic top plan view of a motor vehicle showing the arrangement of the retrorocket braking system in the vehicle.

FIG. 2 is a schemtaic side elevation view of a vehicle showing the location and angular disposition of the retrorocket braking system in the vehicle.

DETAILED DESCRIPTION OF THE INVENTION

Since the exact location of the rocket motor and the specific means for securing the rocket motor on the frame of a land vehicle may vary from vehicle to vehicle, FIG. 1 only shows the location and arrangement of the rocket motor and exhaust nozzles relative to the vehicle in a schematic manner. It is obvious that the structural framework of automobiles, trucks, trains and other land vehicles differ significantly but the location of the rocket motor should be substantially the same in each type of vehicle relative to the centerline of the vehicle and the center of mass of the vehicle.

Referring now to FIG. 1, the rocket motor 10 is secured in the frame of a vehicle 12 by any suitable means with the longitudinal centerline of the rocket motor being disposed along the centerline of the vehicle. A pair of exhaust nozzles 14 and 16 are connected to the outlet end of the rocket motor to form a substantially Y-shaped configuration. The ends of the exhaust nozzles 14 and 16 terminate at the sides of the vehicle in the vicinity of the forward edge of the front doors 18 and 20 respectively. Although it is most convenient to mount the rocket motor 10 along the centerline of the vehicle, the specific frame structure of the vehicle or other equipment secured to the frame of the vehicle might prevent locating the motor in this manner. It is conceivable that the motor could be mounted to one side or the other of the centerline with the axis of the motor disposed parallel to the centerline of the vehicle. Under these circumstances it would be necessary to compensate for the differential in thrust in each of the exhaust nozzles by varying the diameters of the exhaust nozzles. For example, if the rocket motor 10 was mounted to the left of the centerline as viewed in FIG. 1, then the diameter of the exhaust nozzle 14 would be larger than the diameter of the exhaust nozzle 16 to compensate for the difference in thrust caused by the different lengths of the nozzles. Although it is not absolutely necessary, the ends of the nozzles 14 and 16 may be somewhat flared in the conventional manner. Suitable cover means 22 and 24 may be provided for each of the nozzles 14 and 16 respectively. The covers may be clipped directly to the nozzles by any suitable means such as a spring clip or they may be hinged to the ends of the nozzles. It is also contemplated that the cover could be part of the body work on the vehicle and the cover hinged or snapped thereto. In any event, whatever means are used to hold the covers in the closed position should be releasable automatically upon an increase of pressure in the exhaust nozzles upon firing of the engines.

Each of the exhaust nozzles can be appropriately insulated by external means and should be arranged so as not to be in close proximity to any heat sensitive portions of the vehicle such as the gas line or combustible elements. Furthermore, the exhaust nozzles may be lined with any suitable well known ablative material to control the temperature during the firing of the rocket motor. The firing time for the rocket motor will be on the order of ½ to 1 second which will also help to minimize the heat problem.

The rocket motor should be mounted at an angle approximately 5° with respect to the horizontal, as best shown in FIG. 2. This slight downward incline from the front of the vehicle to the rear of the vehicle will provide a downward component of thrust which will increase the loading on the rear tires of the vehicle to increase the frictional grip of the tires on the road surface to aid in controlling the vehicle while the same is brought to a quick stop without lateral swerving. Due to the incline of the rocket motor and nozzles, the plane containing the lines of thrust of the nozzles will intersect the road surface rearwardly of the rear tires of the vehicle. In this manner, excessive loading of the tires to the point of failure will be eliminated and a greater proportion of the total thrust will be directed horizontally to aid in bringing the vehicle to a quick safe stop. The Y-shaped arrangement of the exhaust nozzles with the thrust lines meeting in back of the center of mass, minimizes the rotational effects that would occur with slight variations in the position of the center of mass.

The triggering system for initiating the firing of the rocket can be manual or automatic. However, the delay involved in the manual triggering of the rocket will substantially extend the stopping time and distance. Furthermore, under emergency conditions, the operator of the vehicle might not have the presence of mind to manually initiate the rocket firing. Any automatic triggering system should be tied in with a speed sensor which is operable in conjunction with a malfunction or range detection system. The minimum speed required for triggering of the system is dependent upon the thrust of the rocket installed in the vehicle. For example, a fifty pound rocket capable of generating 15,000 pounds of thrust in one second during a complete burn, is capable of exerting 5G on a 3,000 pound vehicle. This is enough to bring the vehicle to a complete stop from 110 m.p.h. in one second. Likewise, a 25 pound rocket exerting 5G on a similar vehicle during a complete burn, will bring the vehicle from 55 m.p.h. to a complete stop in 0.5 second and a distance of 20 feet. Therefore, the minimum speed level should be calculated so that the rocket installed in the vehicle will bring the vehicle to complete stop from that calculated speed upon a complete burn of the rocket. In this way no reverse travel of the vehicle will take place subsequent to the stopping of the vehicle. Since, in the case of automotive vehicles, strengthened frames and improved restraint devices such as air bags now allow survival of a 60 m.p.h. barrier collision, a passager can survive in a vehicle equipped with the present retrorocket braking system at speeds up to 115 m.p.h. just prior to impact provided there is sufficient time for the 25 pound retrorocket in the above example to achieve a complete burn. If the rocket can achieve a complete burn, the speed of the vehicle will be reduced to 60 m.p.h. or less, at impact.

In order to have a retrorocket system operable at lower vehicle speeds, it would be feasible to utilize the same size rocket as used above with respect to stopping the vehicle at speeds in excess of 55 m.p.h. However, at lower speeds, it would be necessary to provide means for venting the pressure chamber of the rocket after a predetermined period of burn so as to safely bring the vehicle to a stop from speeds lower than 55 m.p.h. without any subsequent rearward travel of the vehicle. Another possibility would be to have a plurality of rockets communicating with a single combustion chamber leading to the Y-shaped exhaust nozzles. A suitable sequencing means could be devised for firing one or more rockets either simultaneously or sequentially depending upon the speed of the vehicle at ignition.

Further factors which would enter into consideration in determining ignitioning of the rocket could be a zero G reading on any wheel with a suitable time delay which would indicate that the vehicle has left the ground or a lateral G reading above 0.4G which would indicate that the vehicle is beginning to turn as in a lateral skid. Another indicator would be an impact above 5G which could be caused by the vehicle hitting a minor fixed obstacle such as a curb or other low articles which would be indicative of off the road travel. As indicated previously, all of these sensing arrangements would operate in conjunction with the speed of the vehicle to determine whether or not the retrorocket should be fired or for how long the rocket should be fired if such capabilility is available. The sensing devices to detect the various G conditions mentioned above, as well as radar devices to indicate the approach of obstacles, are all well known in the art and they are not described in detail herein.

The specific rocket motor configuration and location shown is only exemplary and the motor could obviously be of a different shape and be located in a slightly different location in the vehicle depending upon the structural considerations of the vehicle. For example, the motor could be V-shaped with two exhausts disposed at an angle to each other.

While the invention has been shown and particularly described with reference to a preferred embodiment thereof, it will be understood by those in the art that various changes in form and details may be made therein without departing from the spirit and scope of the invention.

What is claimed is:

1. A retrorocket braking system for land vehicles comprising, a rocket motor, means for mounting said motor in a vehicle with the exhaust thereof facing forwardly of the vehicle and a pair of exhaust nozzles communicating with said motor exhaust and extending forwardly and outwardly to the sides of said vehicle in a V-shaped configuration with the apex of said V-shaped configuration disposed rearwardly of the center of mass of said vehicle, said motor and nozzles being disposed in a plane disposed at an acute angle relative to the horizontal and intersecting the support surface for the vehicle at a point rearwardly of the vehicle.

2. A system as set forth in claim 1 wherein said acute angle is approximately 5°.

3. A system as set forth in claim 1 wherein said vehicle is an automobile having four wheels and at least one door on each side thereof, said nozzles extending to the sides of said vehicle at a point near the forward edge of each door respectively.

References Cited

UNITED STATES PATENTS

| | | | |
|---|---|---|---|
| 3,003,572 | 10/1961 | Sänger | 188—2 R |
| 3,064,762 | 11/1962 | Zizzi | 188—2 R |
| 3,434,569 | 3/1969 | Peters et al. | 188—2 R |

EVON C. BLUNK, Primary Examiner

B. H. STONER, Jr., Assistant Examiner

U.S. Cl. X.R.

244—110 B